(12) United States Patent
Dong et al.

(10) Patent No.: US 9,355,333 B2
(45) Date of Patent: *May 31, 2016

(54) PATTERN RECOGNITION BASED ON INFORMATION INTEGRATION

(71) Applicant: International Business Machines Corporation, Armonk, NY (US)

(72) Inventors: Wei Shan Dong, Beijing (CN); Chang Sheng Li, Beijing (CN); Min Li, Beijing (CN); Chun Yang Ma, Beijing (CN); Yu Wang, Beijing (CN); Jun Chi Yan, Shanghai (CN); Chao Zhang, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/746,877

(22) Filed: Jun. 23, 2015

(65) Prior Publication Data

US 2015/0294184 A1   Oct. 15, 2015

Related U.S. Application Data

(63) Continuation of application No. 14/621,665, filed on Feb. 13, 2015.

(30) Foreign Application Priority Data

Feb. 28, 2014   (CN) .......................... 2014 1 0071994

(51) Int. Cl.
*G06K 9/46* (2006.01)
*G06K 9/60* (2006.01)

(Continued)

(52) U.S. Cl.
CPC   *G06K 9/60* (2013.01); *G06F 3/017* (2013.01); *G06F 3/0414* (2013.01);

(Continued)

(58) Field of Classification Search
CPC ....... G06F 3/044; G06F 3/0488; G06F 3/016; G06F 3/03545; G06F 3/0414
See application file for complete search history.

(56) References Cited

U.S. PATENT DOCUMENTS 5,615,283 A * 3/1997 Donchin ............ G06K 9/00429
   382/187
2003/0189603 A1* 10/2003 Goyal ................... G06F 17/273
   715/863

(Continued)

OTHER PUBLICATIONS

Ghorbel et al., Incremental Learning for Interactive Sketch Recognition, 2013, Lecture Notes in Computer Science, pp. 108-118.*
List of IBM Patents or Patent Applications Treated as Related; CN920130177US2, Date Filed: Jun. 23, 2015, pp. 1-2.
Wei Shan Dong, et al.,"Pattern Recognition Based on Information Integration," U.S. Appl. No. 14/621,665, filed Feb. 13, 2015.

*Primary Examiner* — Stephen R Koziol
*Assistant Examiner* — Jonathan S Lee
(74) *Attorney, Agent, or Firm* — Cantor Colburn LLP; Keivan Razavi

(57) ABSTRACT

A method for recognizing a primitive in an image includes recognizing at least one primitive in the image to obtain at least one candidate shape of the at least one primitive, which at least one candidate shape has a respective confidence; determining whether the recognizing of the at least one primitive has a potential error based on the confidence; obtaining auxiliary information about the at least one primitive from a user in response to determining that the recognizing has the potential error; and re-recognizing the at least one primitive at least in part based on the auxiliary information.

9 Claims, 4 Drawing Sheets

(51) Int. Cl.
*G06T 7/00* (2006.01)
*G06F 3/01* (2006.01)
*G06F 3/041* (2006.01)
*G06F 3/0488* (2013.01)
*G06T 7/40* (2006.01)
*G06T 11/20* (2006.01)
*G06K 9/00* (2006.01)
*G06K 9/03* (2006.01)

(52) U.S. Cl.
CPC ....... *G06F 3/04883* (2013.01); *G06K 9/00476* (2013.01); *G06K 9/033* (2013.01); *G06T 7/0042* (2013.01); *G06T 7/0044* (2013.01); *G06T 7/407* (2013.01); *G06T 11/203* (2013.01); *G06T 2207/10004* (2013.01); *G06T 2207/30241* (2013.01); *G06T 2210/12* (2013.01)

(56) References Cited

U.S. PATENT DOCUMENTS

| | | | |
|---|---|---|---|
| 2004/0037463 A1* | 2/2004 | Calhoun | G06K 9/222 382/186 |
| 2006/0045343 A1* | 3/2006 | Tremblay | G06K 9/00476 382/186 |
| 2008/0260240 A1* | 10/2008 | Vukosavljevic | G06K 9/00436 382/159 |
| 2011/0066984 A1* | 3/2011 | Li | G06F 3/04883 715/863 |
| 2013/0120279 A1* | 5/2013 | Plichta | G06F 3/04883 345/173 |
| 2014/0006954 A1* | 1/2014 | Raffa | G06F 3/04883 715/733 |

* cited by examiner

PATTERN RECOGNITION BASED ON INFORMATION INTEGRATION

DOMESTIC AND FOREIGN PRIORITY

This application is a continuation of U.S. patent application Ser. No. 14/621,665, filed Feb. 13, 2015, which claims priority to Chinese Patent Application No. 201410071994.6, filed Feb. 28, 2014, and all the benefits accruing therefrom under 35 U.S.C. §119, the contents of which in its entirety are herein incorporated by reference.

BACKGROUND

Embodiments of the present invention generally relate to pattern recognition, and more specifically, relate to a method and system for information integration-based pattern recognition.

Pattern recognition refers to automatic or semi-automatic processing and determination of patterns such as diagrams, voice, or characters using computer technology. Pattern recognition has been widely applied in various fields, including recognition of geometric diagrams. One type of geometric graph is a two-dimensional (2D) graph-based diagram. In the context of the present application, the term "diagram" is a set of primitives and mutual relationships between respective primitives. The primitives may be various 2D diagrams that have a corresponding shape, for example, rectangle, oval, round, triangle, parallelogram, etc. The primitives may have associated texts or may not have texts. The relationship between primitives is generally expressed by line. The line may include a straight line, an arc line, and various kinds of curves. Further, the line may be unidirectional, or directional (including one-way or two-way), which may be represented by an arrow, as an example. Examples of diagrams include, but are not limited to, a flow chart, a block diagram, a tree diagram, a net diagram, etc.

Diagrams have been widely applied in various fields. For example, in many enterprises, research institutions, colleges and various other organizations, large amounts of information are presented through diagrams. For example, a presenter may express a theme(s) with diagrams when making various presentations. For another example, a considerable number of diagrams exist in various books, newspapers, articles and organizations. It is desirable to digitize the diagrams on a non-electronic medium using a pattern recognition technology so as to convert it into a digital format. A known manner is converting a diagram into an image by an image acquisition apparatus such as a camera, and then recognizing the primitives and their connection relationships in the diagram.

However, at least due to the following reasons, the conventional method purely based on image processing is error prone. First, many diagrams are hand-drawn by users, such that the primitives and/or connection in the diagrams are of certain irregularity. Second, in some circumstances, users can only use an image acquisition apparatus on a portable device such as a mobile phone, a tablet computer, a personal digital assistant (PDA) and the like to capture an image of a diagram in a short time. Due to the limitation of factors such as image shooting conditions, resolution and the like, the image quality might not be high, which is adverse to recognition accuracy. Additionally, in a diagram, many primitives have a higher similarity. For example, an ellipse is similar to a circle, and a rectangle is similar to a square, and so on. This brings challenge to pattern recognition as well.

SUMMARY

According to one aspect of the present invention, there is provided a method for recognizing a primitive in an image. The method includes: recognizing at least one primitive in the image to obtain at least one candidate shape of the at least one primitive, which at least one candidate shape has a respective confidence; determining whether the recognizing of the at least one primitive has a potential error based on the confidence; obtaining auxiliary information about the at least one primitive from a user in response to determining that the recognizing has the potential error; and re-recognizing the at least one primitive at least in part based on the auxiliary information.

According to another aspect of the present invention, there is provided a system for recognizing a primitive in an image. The system includes: a recognizing unit configured to recognize at least one primitive in the image to obtain at least one candidate shape of the at least one primitive, which at least one candidate shape has a respective confidence; a potential error detecting unit configured to determine whether the recognizing of the at least one primitive has a potential error based on the confidence; an auxiliary information obtaining unit configured to obtain auxiliary information about the at least one primitive from a user in response to determining that the recognizing has the potential error; and a re-recognizing unit configured to re-recognize the at least one primitive at least in part based on the auxiliary information.

It would be understood through the following depiction that, different from the prior art, according to embodiments of the present invention, the shape of the primitive is recognized not only based on image features. On the contrary, according to embodiments of the present invention, all primitive candidate shapes recognized based on image features have a respective confidence. If it is determined that the confidence-based recognition might have a potential accuracy issue, additional auxiliary information might be obtained from the user. By integrating the auxiliary information and image information during the recognition stage and/or in the decision result, the recognition accuracy can be effectively enhanced.

BRIEF DESCRIPTION OF THE DRAWINGS

The above and other objectives, features and advantages of the present invention will become more apparent through more detailed depiction of the exemplary embodiments of the present invention with reference to the accompanying drawings.

Same or like reference numerals are used to represent same or corresponding elements throughout the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
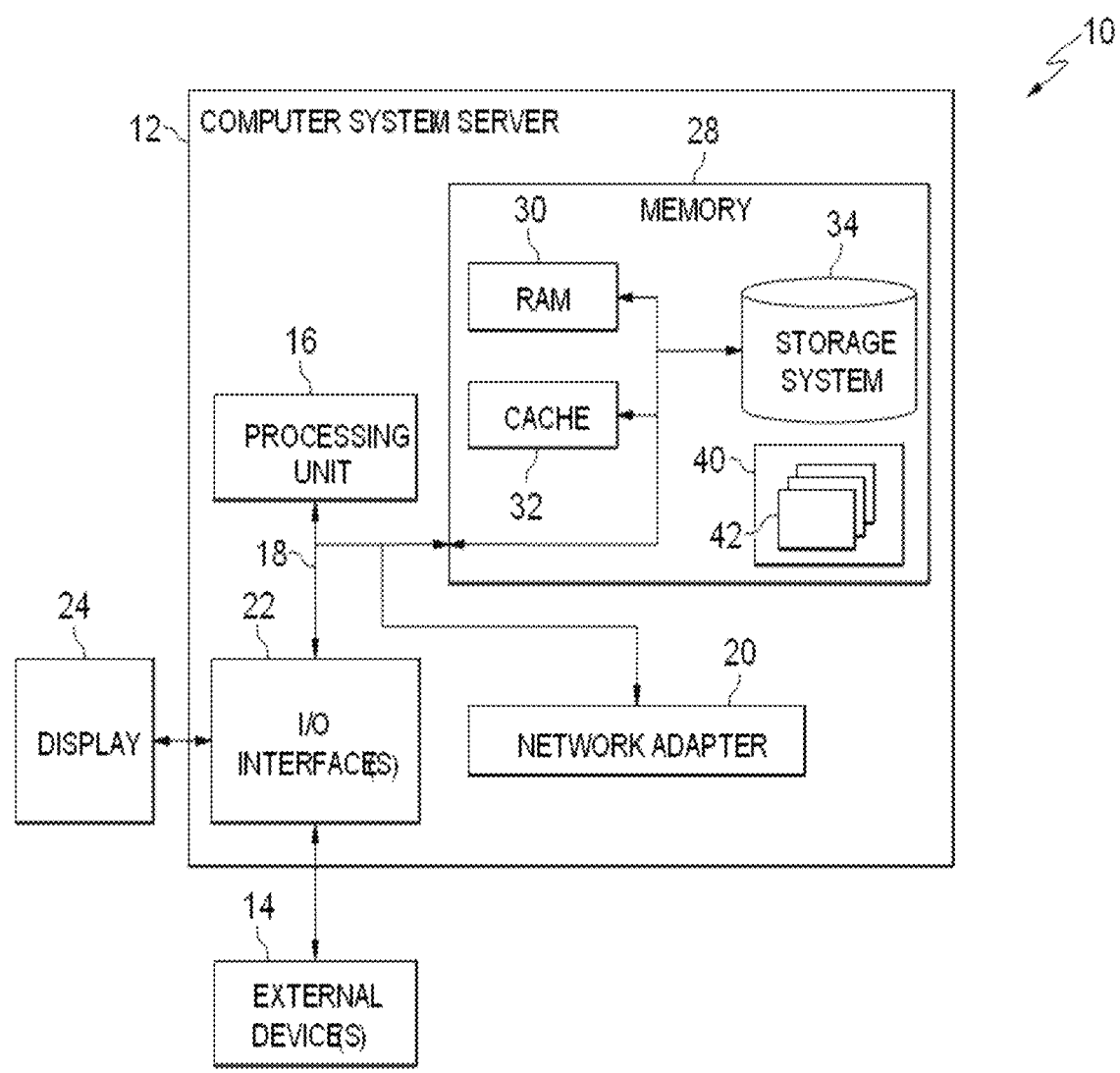
FIG. 1 shows a schematic block diagram of an exemplary computer system/server which is applicable to implement embodiments of the present invention.

FIG. 1 shows a block diagram of an exemplary computer system/server 12 which is applicable to implement embodiments of the present invention. The computer system/server 12 as shown in FIG. 1 is only an example, which should not construct any limitation to the functions and application scope of embodiments of the present invention.

As shown in FIG. 1, the computer system/server 12 is embodied in the form of a general computing device. Components of the computer system/server 12 may comprise, but not limited to, one or more processors or processing units 16, a system memory 28, and a bus 18 connecting different system components (including the system memory 28 and the processing unit 16).

The system bus 18 indicates one or more of a plurality of bus structures, including a memory bus or a memory controller, a peripheral bus, a graphic acceleration port, a processor, or a local bus using any bus structure in the plurality of bus structures. For example, the above hierarchical structures include, but not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

The computer system/server 12 may include various kinds of computer system-readable mediums. These mediums may be any available mediums accessible by the computer system/server 12, comprising volatile and non-volatile mediums, mobile and non-mobile mediums.

The system memory 28 may comprise a computer system readable medium in a form of volatile memory, for example, a random access memory (RAM) 30 and/or a cache memory 32. The computer system/server 12 may further comprise other mobile/non-mobile, volatile/non-volatile computer system storage mediums. As an example, the memory system 34 may be used to read/write a non-mobile, non-volatile magnetic medium (not shown in FIG. 1, generally called "a hard disk driver"). Although not shown in FIG. 1, a magnetic disk driver for reading/writing a mobile, non-volatile magnetic disk (for example, a "floppy disk") and an optical disk driver for reading/writing a mobile, non-volatile optical disk (for example, CD-ROM, DVD-ROM, or other optical medium) may be provided. In these cases, each driver may be connected to the bus 18 via one or more data medium interfaces. The memory 28 may comprise at least one program product that has a set (for example, at least one) program modules, and these program modules may be configured to perform the functions of various embodiments of the present invention.

A program/utility tool 40 comprising a set (at least one) of a program module 42 may be stored in for example the memory 28; such program module 42 comprises, but not limited to, an operating system, one or more applications, other program modules, and program data, and each of these examples or a certain combination thereof might comprise implementation of a network environment. The program module 42 generally executes the functions and/or methods in the embodiments as described according to the present invention.

The computer system/server 12 may also communicate with one or more peripheral devices 14 (for example, a keypad, a pointing device, a display 24, etc.), and may also communicate with one or more device that enable the user to interact with the computer system/server 12, and/or communicate with any device (for example, network card, modem, etc.) that enables the computer system/server 12 to communicate with one or more other computing devices. Such communication may be performed via an input/output (I/O) interface 22. Moreover, the computer system/server 12 may also communicate with one or more networks (for example, a local area network (LAN), a wide area network (WAN), and/or a public network, for example, Internet). As shown in the figure, a network adaptor 20 communicates with other modules of the computer system/server 12 via the bus 18. It should be appreciated that although not shown in the figure, other hardware and/or software modules may be used in combination with the computer system/server 12, including, but not limited to, micro-code, device driver, redundancy processing unit, external disk driving array, RAID system, magnetic tape driver, and a data backup storage system, etc.

Figure 2:
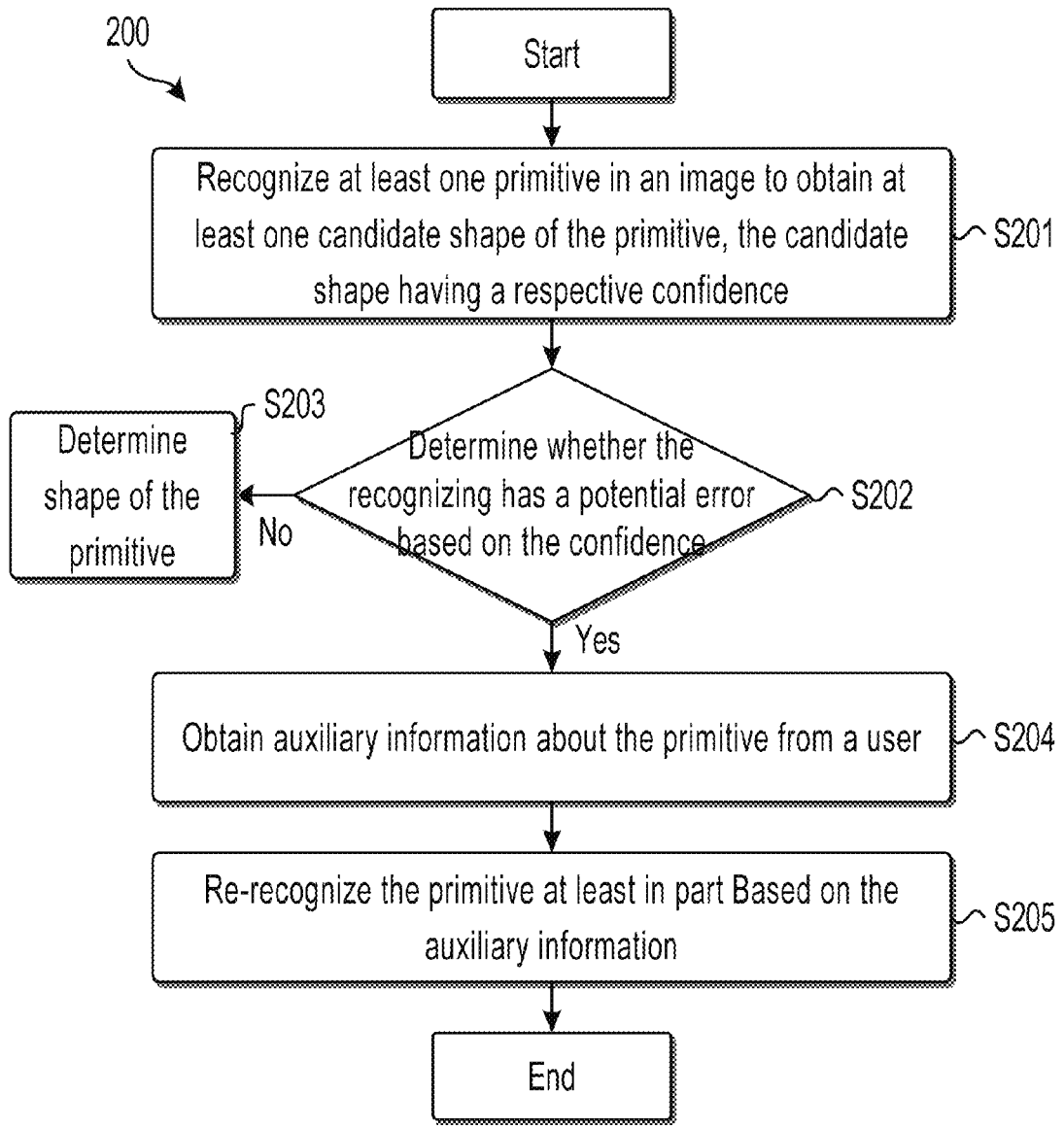
FIG. 2 illustrates a flow chart of a method for recognizing a primitive in an image according to an embodiment of the present invention.

FIG. 2 illustrates a flow chart of a method 200 for recognizing a primitive in an image according to an embodiment of the present invention.

In block S201, at least one primitive in the image is recognized. According to embodiments of the present invention, the image to be processed may be obtained from a tangible media by a user using an image acquisition apparatus. For example, the user may use a camera, a video camera, or an image acquisition apparatus on a portable device such as a mobile phone, a tablet computer, a PDA, to acquire an image or one or more parts of the image. Alternatively or additionally, the image or a part thereof may be directly inputted in a digitalized fashion.

According to embodiments of the present invention, the image or a part thereof includes a diagram composed of one or more primitives. As mentioned above, a diagram may, for example, include a flowchart, a block diagram, a tree diagram, a network diagram, etc. Each primitive has a corresponding shape, for example, rectangle, triangle, round, etc. The primitives may have associated texts or may not have texts. The relationship between primitives is expressed by line. According to embodiments of the present invention, the line may also be treated as a special primitive to be processed.

According to embodiments of the present invention, in order to recognize the primitives in an image, at block S201, processing of the image at least includes applying a recognition process to the image. Examples of recognition process may include, but not limited to, a decision theory methodology, a syntax methodology, a statistic model methodology, etc. For example, in some embodiments, image may be processed using various approaches based on statistical models, such as a support virtual machine (SVM), a principal component analysis (PCA), a neural network, and the like, so as to recognize the shape of one or more primitives in the image. For those algorithms that need training, the train process may be completed in advance with in an offline fashion (i.e., before the recognition). Alternatively or additionally, a real-time online training (i.e., during the recognition process) is also possible. It is to be understood that any currently known or future developed image analysis and/or recognition method may be used in conjunction with embodiments of the present invention. The scope of the present invention is not limited thereto.

It should be noted that according to embodiments of the present invention, at block S201, various appropriate pre-processing and/or post-processing may be performed to the image. For example, before applying the recognition process, the image may be subject to pre-processing to enhance the resolution of the image, sharpen the image, and reduce the noise in the image, and the like. Such pre-processing and/or post-processing is known to those skilled in the art, which will not be detailed here.

According to embodiments of the present invention, the recognized primitive has at least one candidate shape. Each candidate shape has a respective confidence. The confidence may be a numerical value or a literal depiction (e.g., "high," "medium," "low," etc.). The confidence indicates the probability of a primitive to have a corresponding candidate shape. In other words, where the confidence is higher, the probability of the primitive to have a candidate shape associated with the confidence will be higher. According to embodiments of the present invention, the confidence may be provided by the recognition process. For example, during various recognition processes based on statistical models, for each possible recognition result (i.e., candidate shape), the recognition process will provide an associated accuracy level. This accuracy level may used as the confidence for a candidate shape. Other manners of determining a confidence are also possible, and the scope of the present invention is not limited hereto.

Next, the method 200 proceeds to block S202 to determine whether the recognizing of the at least one primitive has a potential error based on the confidence of the candidate shape obtained at block S201.

In some embodiments, for a primitive, if the confidences of all of its candidate shapes are lower than a threshold (called "first threshold)," it may be determined that the recognition of the primitive might not be accurate, i.e., having a potential error. The first threshold may be any other appropriate value or may be pre-determined or may be dynamically updated during the use.

Alternatively or additionally, in an embodiment where a primitive might have more than one candidate shape, confidences of different candidate shapes may be compared. Specifically, in some embodiments, if the confidences of at least two candidate shapes among the candidate shapes are higher than the first threshold, while the difference between the confidences of the at least two candidate shapes is lower than another threshold (called "second threshold"), then it may be determined that there is a potential recognition error. For example, suppose a primitive has two candidate shapes: circle and rectangle, and suppose the first threshold is 70%, and the second threshold is 10%. If the confidence of the circle is 79%, while the confidence of the rectangle is 83%, it may be deemed that there is potential recognition error. The reason is that the confidences of both candidate shapes exceed the first threshold, but the difference between the two is lower than the second threshold. In this case, whether the round or the rectangle is selected as the shape of the primitive, there would be a higher risk of recognition error.

Still with reference to FIG. 2, if it is determined at block S202 that there is no potential recognition error (the branch "No"), according to embodiments of the present invention, one of the candidate shapes may be selected as the shape for the primitive. For example, in some embodiments, the candidate shape with the highest confidence is determined as the shape for the primitive. Alternatively, all candidate shapes whose confidences are higher than the threshold may be presented to the user for selection.

On the contrary, if it is determined at block S202 that there might be a potential recognition error (branch "Yes"), the method proceeds to block S204 of obtaining, from the user, auxiliary information about the recognized primitive.

In some embodiments, at block S204, it may be prompted to the user to re-input the image or the part of the image including a to-be-recognized primitive, so as to re-capture the image or the part thereof. It should be noted that the term "re-capture" means using any appropriate image acquisition apparatus to capture again the digitalized image or a digitalized part of the image including the to-be-processed primitive. Alternatively, relevant parameters such as the image resolution and the like which is needed for recognition may be indicated to the user. When the quality of the initially inputted image is too low so as to significantly affect the recognition accuracy, it might be beneficial.

Alternatively or additionally, at block S204, all candidate shapes of the recognized primitive may be displayed to the user. For example, in some embodiments, the candidate shapes may be presented to the user in a list. Each candidate shape may be represented for example by text and/or diagram. Specifically, in some embodiments, a recognition confidence associated with each candidate shape may be displayed to the user for reference. In this way, the user may select a candidate shape as the shape for the primitive through a user interface (UI). In such an embodiment, the user's selection of the candidate shape will be used as auxiliary information.

Alternatively or additionally, in some embodiments, at block S204, the user may be prompted to hand-draw the currently being processed primitive. For example, in some embodiments, an area may be displayed on a user interface for the user to draw the shape of the image therein. To this end, in some embodiments, the user may draw the primitive through a mouse, a trackball, and the like. Alternatively, when the user uses a terminal device having a touch-sensitive surface, he/she may also use a finger to draw the primitive on the touch-sensitive surface. As another example, the user may also directly draw the primitive in a space without contacting the capturing device. At this point, any appropriate technology such as computer vision, proximity sensor to capture gesture information of the user.

According to embodiments of the present invention, in response to the user drawing a primitive, gesture information for the user in drawing the primitive may be obtained as auxiliary information. As an example, the gesture information may comprise trajectory information of drawing the primitive by the user. For example, in some embodiments, the trajectory information may comprise the trajectory range. As already known, the trajectory range, for example, may be expressed by a bounding box of the trajectory. Alternatively or alternatively, the trajectory information may also comprise directions of the user at one or more positions on the trajectory.

Specifically, in some embodiments, the trajectory information may comprise pressure and/or velocity on at least one position on the primitive trajectory. As an example, as mentioned above, the user may draw a primitive by virtue of a touch-sensitive surface of the terminal device in some embodiments. As known, one or more pressure sensors may be used in conjunction with the touch-sensitive surface so as to sense and record the pressures on one or more points on the touch-sensitive surface. In such an embodiment, when the user draws a primitive on the touch-sensitive surface with a finger, the pressure at one or more positions on the trajectory may be obtained. As will be depicted in detail hereinafter, by obtaining the pressure and/or velocity at one or more positions on the primitive trajectory, the recognition accuracy of a primitive shape may be efficiently enhanced.

Then, the method 200 proceeds to block S205. At block S205, the primitive in the image may be re-recognized at least in part based on the auxiliary information obtained at block S204.

In some embodiments, as indicated above, the auxiliary information may comprise the re-captured image or a part thereof as captured using the image capturing device. Accordingly, in such an embodiment, a recognition process may be applied to the re-captured image. In some other embodiments, the auxiliary information may be selection of a candidate shape by the user. At this point, the shape of the primitive may be determined directly based on the user's selection.

Moreover, in some embodiments, the auxiliary information and the recognition process for processing the image may be integrated at the feature level or during the recognition process, so as to re-process the image in association with the auxiliary information. For example, in some embodiments, the auxiliary information may be used as a parameter during the recognition process. As already known, during the traditional recognition process only dependent on image processing, image features such as pixel grayscale, holographic information, curvature, and the like may be used as parameters to train a model and recognize a feature. In contrast, according to embodiments of the present invention, the auxiliary information may be used as additional parameters to train a model and recognize a feature. As indicated above, the auxiliary information, for example, may comprise gesture information obtained during the process in which the user draws a primitive, such as the range, direction, velocity, pressure, and the like of the trajectory. Accordingly, such information may be considered during the establishment and use of the model.

Several specific embodiments are considered only for the purpose of illustration. In an embodiment where the auxiliary information includes a trajectory range of a hand-drawn primitive, the area of applying the recognition process may be restricted based on the range. In this way, interference from unrelated information may be effectively excluded, thereby enhancing the accuracy of recognition. For another example, the velocity features of various shapes drawn by the user may be modeled into a recognition model. It has been found that the user has a greater velocity when drawing a straight line, while has a smaller velocity when drawing a curve line. This feature may be modeled through model training. In this way, if it is hard to determine whether a line is a straight line or a curve line purely based on the image feature, the velocity information when the user draws the line may be referred to for the determination. For another example, it has been found that the user generally has a smaller velocity when drawing a turning point (e.g., the apex of a triangle or a polygon) of the shape, while has a greater velocity when drawing a line. By modeling and using such a feature, it will be helpful to determine the turning point of a primitive shape when applying the recognition process.

As another example, as indicated above, in some embodiments, the auxiliary information may comprise pressure at one or more positions on a primitive trajectory. In this way, the relationship between the pressure and shape may be modeled. For example, it has been found that the pressure is greater at the start, end, and turning point of a line, while smaller at other positions. By modeling such a feature, during applying the recognition process, such feature as pressure information may be used to facilitate recognition of a start, end, and/or turning point.

In the exemplary embodiment depicted above, the auxiliary information and image feature are dynamically integrated at the feature level. Alternatively, in other embodiments, the auxiliary information and image processing may be integrated at a decision level at block S205. In this embodiment, at least one additional candidate shape of the primitive may be recognized only based on the auxiliary information (e.g., the trajectory, trajectory range, direction, position, pressure, and the like of the hand-drawn primitive). Recognition of the shape of the primitive based on auxiliary information such as user gesture substantively belongs to an issue of online model recognition, which is already known in the art and will not be detailed here. In this way, two groups of candidate shapes may be obtained, namely, the at least one candidate shape obtained using offline recognition based on the image processing technology at block S201, and at least one additional candidate shape obtained using online recognition based on auxiliary information at block S205. In this way, the shape of the primitive may be determined based on the two groups of candidate shapes.

For example, in some embodiments, the additional candidate shape recognized based on gesture information may also have a respective confidence. Similar to block S201, the confidence may be provided by the recognition process. In this embodiment, candidate shapes whose confidences in the two groups of candidate shapes are higher than the predetermined threshold are first selected. Then, the selected candidate shape having the highest confidence may be determined as the shape for the primitive. Alternatively, for those candidate shapes existing in the two groups, the confidences of the candidate shapes in the two groups may be subject to various operations, such as arithmetic averaging, weighted averaging, addition, multiplication, etc. The outcomes of the operations may be used as the final confidences of the candidate shapes. The candidate shape having the highest confidence may be determined as the shape for the primitive. Please note that what are described here are only several examples in conjunction with two groups of candidate shapes. Any alternative or additional manner may like fall within the scope of the present invention.

According to embodiments of the present invention, at block S205, the shape of the primitive may be determined automatically. Alternatively, one or more candidate shapes derived through re-processing may also be displayed to the user (like in block S202) for the user to select. Moreover, if the shape of the primitive cannot be accurately determined after re-reorganization at block S205, the method 200 may be reiteratively applied. In other words, blocks S202 to S205 may be performed one or more times as required.

Additionally, according to embodiments of the present invention, various subsequent operations may be performed with respect to the recognized primitive. For example, in some embodiments, the attributes of the primitive may be adjusted based on user input. As an example, the attributes of the primitive may include, but not limited to, the position, size, color, angle, associated texts of the primitive, and the like. The user input may be inputted by an interaction tool such as mouse, keyboard and the like. Alternatively or additionally, the user input for controlling the attributes of the primitive may also include voice input, gesture input, and the like. The scope of the present invention is not limited thereto.

Moreover, according to embodiments of the present invention, the diagrams in the image may be constructed based on the recognized primitive, e.g., a flowchart, a block diagram, and the like. Specifically, according to embodiments of the present invention, the processed image may only include a part of the diagram. Therefore, various parts of the diagram formed by the recognized primitives may be stitched to form the final complete diagram. Any currently known or future developed manner may be used in conjunction with embodiments of the present invention, e.g., phase correlation algorithms, automatic panoramic stitching, etc. Additionally, according to embodiments of the present invention, the generalized diagram may be converted into any suitable manner so as to be used in a given target machine.

Figure 3A:
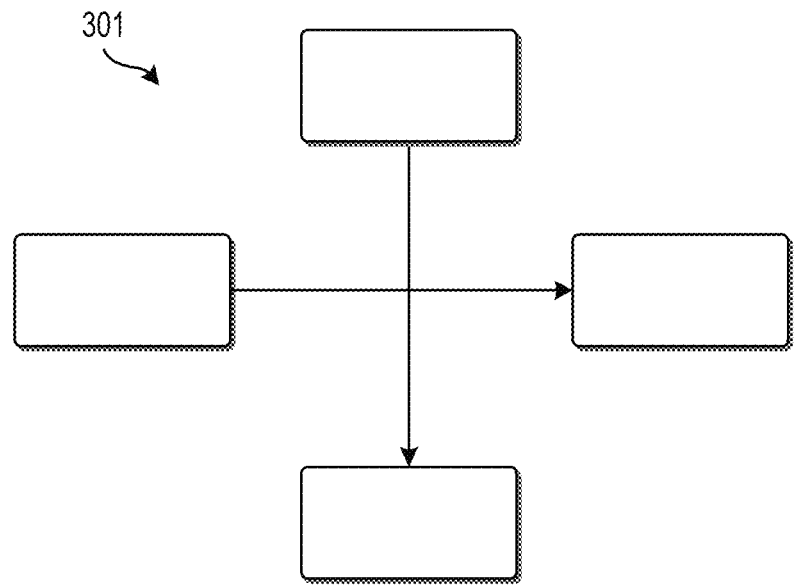
FIGS. 3A and 3B show a schematic diagram of a to-be-processed image according to embodiments of the present invention.
Figure 3B:
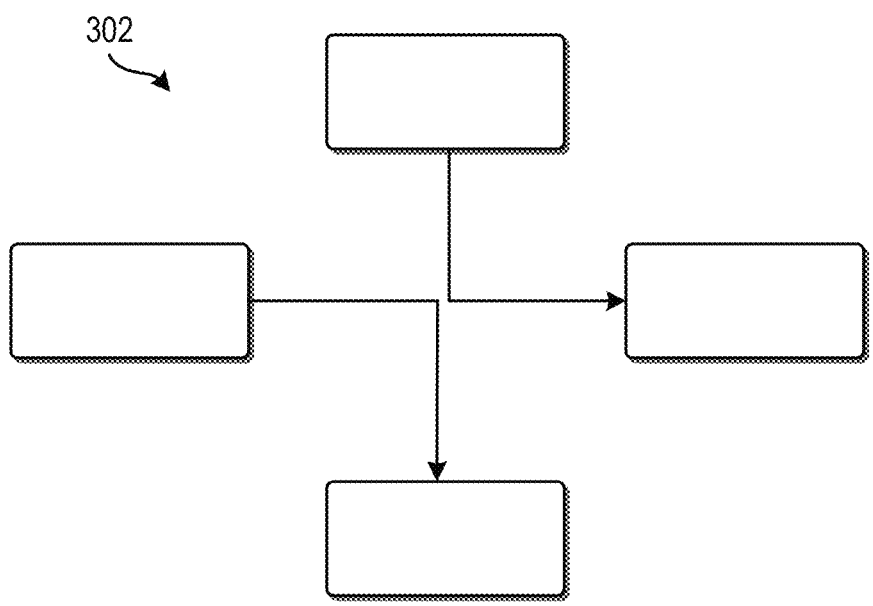

Embodiments of the present invention can significantly enhance the accuracy and efficiency of primitive recognition, thereby improving the digitalized processing of a diagram. As an example, FIGS. 3A and 3B show two to-be-processed images 301 and 302, respectively. The two diagrams in images 301 and 302 can hardly be distinguished only based on the image feature per se. However, by virtue of the auxiliary information, the recognition accuracy may be significantly improved. For example, as indicated above, the user may be prompted to draw the two primitives. Through obtaining the primitive trajectory drawn by the user, it may be determined that the primitive included in the image 301 includes two intersected straight lines, while image 302 includes two polylines.

Figure 4:
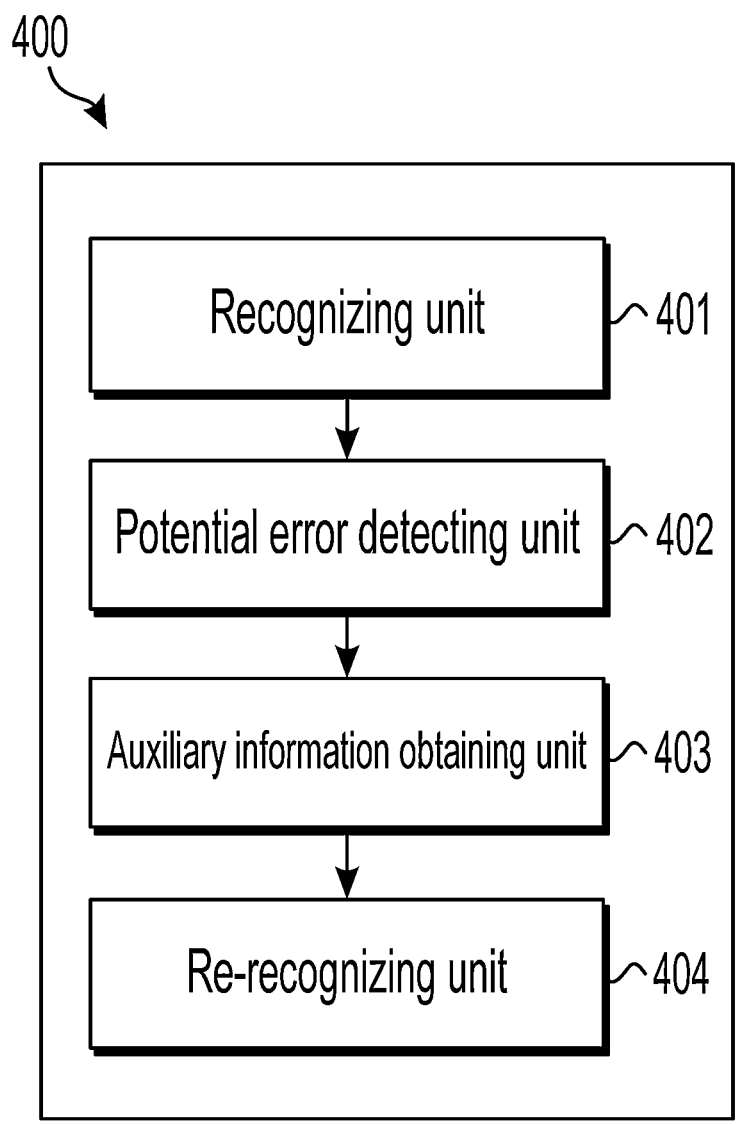
FIG. 4 illustrates a block diagram of a system for recognizing a primitive in an image according to an embodiment of the present invention.

With reference to FIG. 4, a block diagram of a system 400 for recognizing a primitive in an image according to an embodiment of the present invention is shown. As shown, the system 400 comprises: a recognizing unit 401 configured to recognize at least one primitive in the image to obtain at least one candidate shape of the at least one primitive, the at least one candidate shape having a respective confidence; a potential error detecting unit 402 configured to determine whether the recognizing of the at least one primitive has a potential error based on the confidence; an auxiliary information obtaining unit 403 configured to obtain auxiliary information about the at least one primitive from a user in response to determining that the recognizing has the potential error; and a re-recognizing unit 404 configured to re-recognize the at least one primitive at least in part based on the auxiliary information.

In some embodiments, the potential error detecting unit 402 comprises at least one of the following: a first potential detecting unit configured to, if the confidence of each candidate shape in the at least one candidate shape is lower than a first predetermined threshold, determine that the recognizing of the at least one primitive has a potential error; and a second potential error detecting unit configured to if the confidences of at least two candidate shapes among the at least one candidate shape are higher than the first predetermined threshold, while a difference between the confidences of the at least two candidate shapes is lower than a second predetermined threshold, determine that the recognizing of the at least one primitive has a potential error.

In some embodiments, the auxiliary information obtaining unit 403 may comprise at least one of the following: a first obtaining unit configured to receive at least one part of the image that is re-captured; and a second obtaining unit configured to receive a selection of the at least one candidate shape by the user. Alternatively or additionally, the auxiliary information obtaining unit 403 may comprise a third obtaining unit configured to obtain gesture information of the user drawing the at least one primitive as the auxiliary information, which gesture information comprises trajectory information of the at least one primitive. For example, in some exemplary embodiments, the trajectory information may comprise at least one of the following: velocity on at least one position on the trajectory, and pressure on at least one position on the trajectory. Specifically, in some embodiments, the at least one primitive is drawn on a touch-sensitive surface of one terminal device, and the pressure on at least one position on the trajectory is detected via the touch-sensitive surface.

In some embodiments, the re-recognizing unit 404 may comprise: a re-processing unit configured to re-process the image in association with the auxiliary information, wherein the auxiliary information is used as a parameter for processing the recognition process of the image. Alternatively or additionally, in some embodiments, the re-recognizing unit 404 may comprise: an ancillary recognizing unit configured to recognize the at least one primitive using the auxiliary information so as to obtain at least one additional candidate shape of the at least one primitive; and an integrating unit configured to integrate the at least one candidate shape and the at least one additional candidate shape to determine the shape of the at least one primitive.

In some embodiments, the system 400 may also comprise: an attribute adjusting unit (not shown) configured to adjust an attribute(s) of the re-recognized at least one primitive based on user input.

For the sake of clarity, FIG. 4 does not show alternative units or sub-units comprised in the system 400. However, it is to be understood that all features and operations as depicted above are suitable to the system 400 which are therefore not detailed here. Moreover, the partitioning of the units or sub-units in system 400 is not limiting, but exemplary, intended to describe their major functions or operations logically. Functions of one unit may be implemented by multiple units; in turn, multiple units may also be implemented by one unit. The scope of the present invention is not limited thereto. Moreover, the units comprised in the system 400 as depicted above may be implemented in various manners, including software, hardware, firmware, or any combination thereof.

The present invention may be a system, method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for recognizing a primitive in an image, the method comprising:
    recognizing, with a processing device at least one primitive in the image to obtain at least one candidate shape of the at least one primitive, the at least one candidate shape having a respective confidence;
    determining, based on the confidence, whether the recognizing of the at least one primitive has a potential error, by determining if the respective confidences of at least two of the at least one candidate shape are higher than a first predetermined threshold, and a difference between the respective confidences of the at least two candidate shapes is lower than a second predetermined threshold;
    in response to determining that the recognizing has the potential error, displaying a user-interface and prompting the user to hand-draw the at least one primitive in said user-interface, wherein the hand-drawn primitive is used as auxiliary information; and
    re-recognizing the at least one primitive at least in part based on the auxiliary information.

2. The method according to claim 1, wherein determining, based on the confidence, whether the recognizing of the at least one primitive has a potential error further comprises determining if the respective confidence of each of the at least one candidate shape is lower than the first predetermined threshold, determining that the recognizing of the at least one primitive has a potential error.

3. The method according to claim 1, wherein obtaining auxiliary information about the at least one primitive from the user comprises at least one of the following:
    receiving at least a part of the image that is re-captured; and
    receiving a selection of the at least one candidate shape by the user.

4. The method according to claim 1, wherein obtaining auxiliary information about the at least one primitive from the user comprises:
   obtaining gesture information of the user drawing the at least one primitive as the auxiliary information, the gesture information including trajectory information of the at least one primitive.

5. The method according to claim 4, wherein the trajectory information includes at least one of the following: pressure on at least one position on the trajectory, and velocity on at least one position on the trajectory.

6. The method according to claim 5, wherein the at least one primitive is drawn on a touch-sensitive surface of a terminal device, and wherein the pressure is detected via the touch-sensitive surface.

7. The method according to claim 1, wherein re-recognizing the at least one primitive at least in part based on the auxiliary information comprises:
   re-processing the image in association with the auxiliary information, wherein the auxiliary information is used as a parameter of a recognition process for processing the image.

8. The method according to claim 1, wherein re-recognizing the at least one primitive at least in part based on the auxiliary information comprises:
   recognizing the at least one primitive using the auxiliary information so as to obtain at least one additional candidate shape of the at least one primitive; and
   integrating the at least one candidate shape and the at least one additional candidate shape to determine a shape of the at least one primitive.

9. The method according to claim 1, further comprising:
   adjusting an attribute of the re-recognized at least one primitive based on user input.

* * * * *